(12) United States Patent
Hediger

(10) Patent No.: US 7,648,132 B2
(45) Date of Patent: Jan. 19, 2010

(54) CLAMPING APPARATUS FOR RELEASABLY FIXING A PALLET

(75) Inventor: Hans Hediger, Reinach (CH)

(73) Assignee: Erowa AG, Reinach (CH)

( * ) Notice: Subject to any disclaimer, the term of this patent is extended or adjusted under 35 U.S.C. 154(b) by 521 days.

(21) Appl. No.: 11/284,116

(22) Filed: Nov. 21, 2005

(65) Prior Publication Data
US 2006/0113732 A1    Jun. 1, 2006

(30) Foreign Application Priority Data
Dec. 1, 2004  (CH) ..................... 1980/04

(51) Int. Cl.
B23Q 3/00    (2006.01)
(52) U.S. Cl. .................... 269/310; 279/133
(58) Field of Classification Search ......... 269/309, 269/310, 20; 198/345; 29/896.3, 451; 279/133, 279/19.3, 2.21
See application file for complete search history.

(56) References Cited

U.S. PATENT DOCUMENTS

| 4,738,141 | A | * | 4/1988 | Kas | .............. 73/735 |
| 5,640,371 | A | * | 6/1997 | Schmidt et al. | ............. 367/153 |
| 5,918,870 | A | * | 7/1999 | Stark | .......................... 269/309 |

FOREIGN PATENT DOCUMENTS

| EP | 0 937 537 | 8/1999 |
| EP | 1 044 763 | 10/2000 |

\* cited by examiner

Primary Examiner—Joseph J Hail, III
Assistant Examiner—Jamal Daniel
(74) Attorney, Agent, or Firm—Maginot, Moore & Beck

(57) ABSTRACT

The clamping apparatus comprising a chuck member and a pallet member releasably fixed to the chuck member. The chuck member comprises clamping means for clamping the pallet member to the chuck member. The chuck member has first centering means and the pallet member has second centering means cooperating with the first centering means to define the relative position between the chuck member and the pallet. The chuck member and/or the pallet member are/is provided with at least one damping element consisting at least partially of a compressed composite of metal chips.

22 Claims, 2 Drawing Sheets

CLAMPING APPARATUS FOR RELEASABLY FIXING A PALLET

BACKGROUND OF THE INVENTION

The present invention refers to a clamping apparatus comprising a chuck member and a pallet member adapted to be releasably fixed to the chuck member. The chuck member comprises clamping means for clamping the pallet to the chuck member and first centering means, while the pallet member has second centering means adapted to cooperate with the first centering means to define the relative position between the chuck member and the pallet.

Clamping apparatuses of the kind mentioned above are mainly used to fix work pieces in a positionally well defined manner in the machining area of a machine tool. Thereby, the work piece first is fixed to a pallet and then, the pallet is releasably attached to the chuck member. Alternatively, the work piece itself can constitute the pallet. In most cases, the chuck member itself is fixedly attached to the machine tool. Commonly, such clamping apparatuses are used with milling, grinding, polishing and erosion machines.

A problem in machining the work piece may exist insofar as the machining tool and/or machining fluid jets can excite the clamping apparatus to vibrations, thereby impairing the quality of machining of the work piece.

PRIOR ART

The document EP-A-1 044 763 discloses a holder for exactly positioning a work piece in the machining area of a machine tool, the holder being provided with a vibration damper. By providing such a damper, the problems mentioned herein before should be avoided. On the one hand, the holder comprises connecting elements for attaching it to a fixed supporting structure and, on the other hand, fixing means for holding the work piece. The holder is in the form of a so-called leveling or pendulum head to which a work piece is fixed and which can be finely adjusted in three directions. Thereby, the work piece can be very exactly positioned with regard to the machine tool. The above mentioned vibration damper is intended to absorb the vibration energy induced into the holder through the work piece by the rinsing fluid during an electro erosive machining process. As materials for the damper, particularly rubber or rubber-like materials are suggested.

The document DE-A-199 17 104 discloses another holder provided with a vibration damper. Besides the vibration damper, a region of the holder is provided in which the holder and the supporting structure and/or the work piece are in direct contact. Thereby, a connection shall be realized that is partially hard and partially damped. Such a holder is said to be particularly useful in connection with work pieces subjected to a cutting or lapping operation.

OBJECTS OF THE INVENTION

It is an object of the present invention to provide a clamping apparatus of the kind referred to herein above incorporating a damping element that is stable, has a high rigidity and, simultaneously, provides excellent damping characteristics.

SUMMARY OF THE INVENTION

To meet this and other objects, the present invention provides a clamping apparatus comprising a chuck member and a pallet member releasably fixed to the chuck member. The chuck member comprises clamping means for clamping the pallet to the chuck member. The chuck member has first centering means and the pallet member has second centering means cooperating with the first centering means to define the relative position between the chuck member and the pallet. The chuck member and/or the pallet member are/is provided with at least one damping element consisting at least partially of a compressed composite of metal chips.

A damping element consisting of a compressed composite of metal chips is relatively stiff and provides very good damping properties in view of the load to be expected during machining a work piece fixed to the chuck and the pallet, respectively.

BRIEF DESCRIPTION OF THE DRAWINGS

In the following, an embodiment of the apparatus according to the invention will be further described, with reference to the accompanying drawings, in which.

DETAILED DESCRIPTION OF A PREFERRED EMBODIMENT

Figure 1:
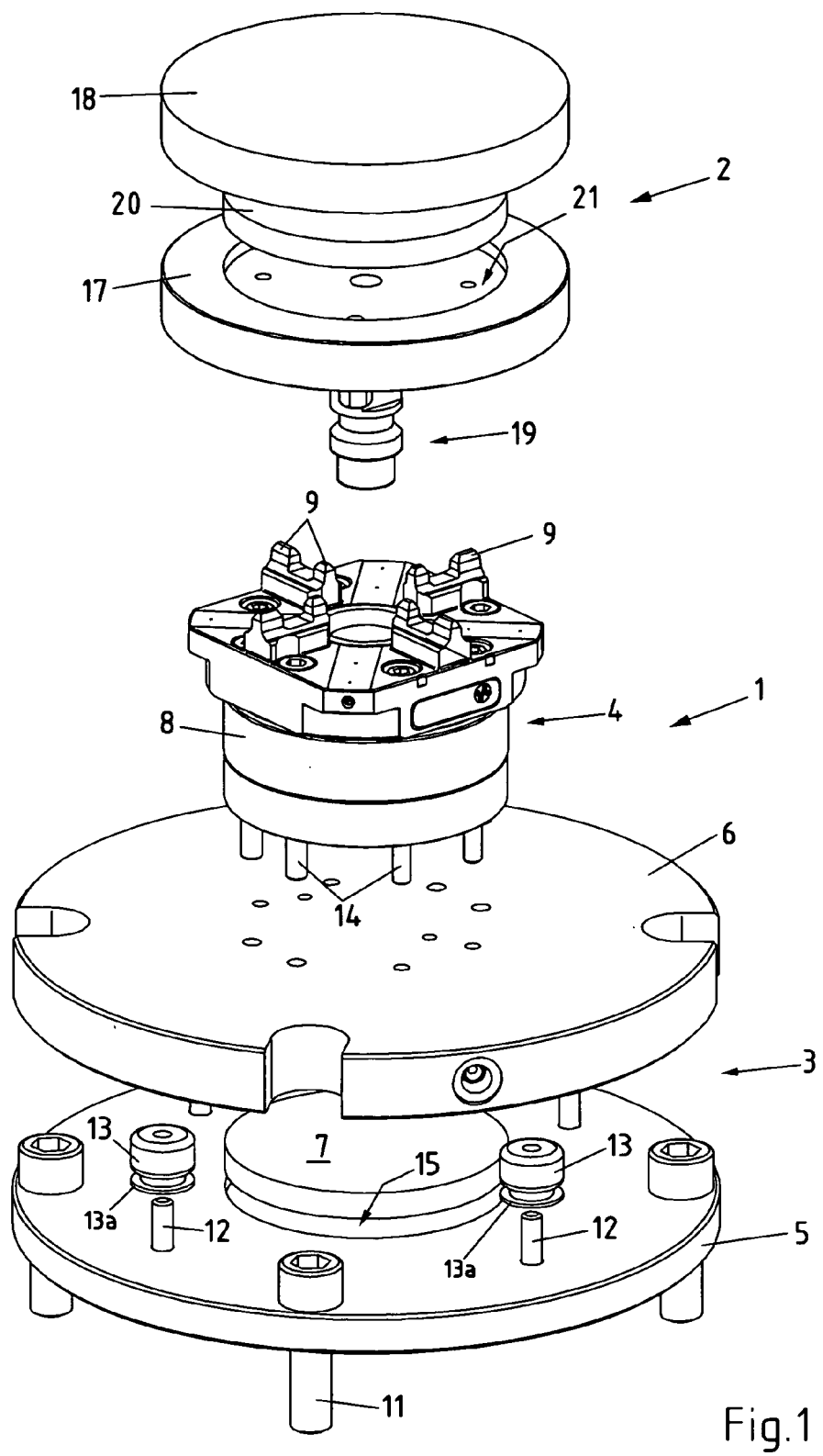
FIG. 1 shows a perspective view of a chuck and a pallet.

With reference to FIG. 1, there is shown a perspective view of the chuck 1 and the pallet 2 including some additional elements to be explained in more detail herein below. The chuck essentially comprises a lower portion 3 and an upper portion 4. The lower portion 3 of the chuck 1 includes a circular base plate 5, a circular support plate 6 and a damping element 7 inserted between the above mentioned circular base and support plates 5, 6. The upper portion 4 of the chuck 1 comprises a cylindrical clamping housing 8, the interior thereof being provided with clamping elements in the form a clamping balls (not shown in FIG. 1), and the top thereof being provided with centering elements in the form of protruding centering pins 9. The base plate 5 is attached to a machining apparatus (not shown) by means of fixing elements 11. The support plate 6 is attached to the base plate 5 by means of screws 12 adapted to be screwed into anchor nuts 13. For receiving these anchor nuts 13, the bottom of the support plate 6 is provided with blind holes (not shown in FIG. 1). The anchor nuts are manufactured of a ductile, but nevertheless elastic material and provided with a central thread made of steel. The end portion of the anchor nuts 13 facing the base plate 5 are provided with a shoulder 13a, the purpose thereof being explained in more detail herein below.

Figure 2:
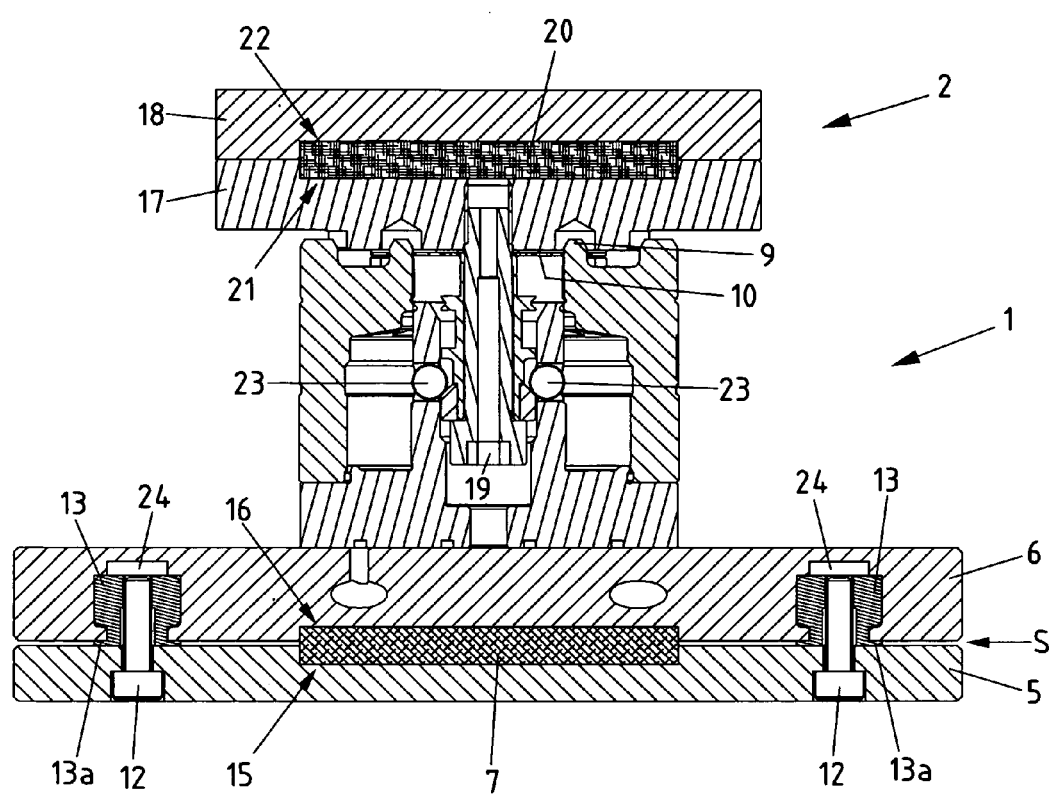
FIG. 2 shows a longitudinal sectional view of the chuck and the pallet of FIG. 1.

The clamping housing 8 is fixed to the support plate 6 by means of screws 14 as well. For receiving the damping element 7, both the base plate 5 and the support plate are provided with circular recesses 15 and 16, respectively, corresponding in size to the diameter of the circular damping element 7, whereby only the recess 15 provided in the base plate 5 is visible in FIG. 1. Both recesses 15 and 16 are shown in FIG. 2.

The pallet 2 comprises a circular base plate 17 and a circular support plate 18. The bottom of the base plate 17 is provided with a clamping pin 19 by means of which the pallet 2 can be clamped to the chuck 1. Moreover, fixed to the bottom of the base plate 17, a elastically resilient disk (not shown in FIG. 1) is provided that comprises a plurality of groove-like recesses, which correspond to the centering pins 9 of the chuck 1 as far as shape and position is concerned and which serve for determining the position of the pallet 2 with regard to the chuck 1 in X- and Y-direction. Also in this case, a damping element 20 is inserted between the base plate 17 and the support plate 18. Similarly, both plates 17 and 18 are provided with circular recesses corresponding in size to the diameter of the circular damping element 20, whereby only the recess 21 provided in the base plate 17 is visible in FIG. 1.

In the present example, the support plate 18 is designed as an integral part of the pallet 2. For fixing the work piece to be machined, the top of the support plate 18 is provided with fixing elements, e.g. in the form of bores, which are, however, not visible in FIG. 1.

Both the damping element 7 of the chuck 1 and the damping element 20 of the pallet 2 comprise a plurality of steel chips or swarfs that are compressed under pressure to a squeezed composite of steel chips. The pressure by which the chips are compressed to a composite can amount to between some ten kN up to several hundreds kN. Depending on the particular application, the compressed composite of steel chips can be embedded in a pottant. Preferably, the damping elements 7, 20 have an essentially cylindrical shape; however, it is also possible to use square or annular damping elements.

FIG. 2 shows a longitudinal sectional view of the chuck 1 and the pallet 2. In this view, it can be clearly seen that the support plate 6 and the base plate 5 are attached to each other by means of screws 12. The screws 12 are received in the anchor nuts 13, the latter ones expanding radially upon screwing in the screws 12. Thus, the anchor nuts 13 are rigidly fixed in the blind holes 24 of the support plate 6. Due to the fact that the screws 12 are fixed to the support plate 6 by means of ductile, but elastic anchor nuts 13, an elastic connection results between the support plate 6 and the base plate 5 via the screws 12. Moreover, besides the connection by means of the screws 12, the two plates 5, 6 are attached to each other by means of the damping element 7.

The thickness of the damping element 7 is chosen such that a gap S remains between the support plate 6 and the base plate 5 once the screws 12 have been tightened. Thereby, the thickness of the shoulder 13a of the anchor nuts 13 is adjusted to the excess thickness of the damping element 7, with the result that it is avoided that the two plates 5, 6 are bent upon tightening the screws 12. Preferably, the gap S is filled with a pottant or at least sealed along its edge to prevent any dust, fluids, chips or similar from penetrating into the gap S.

Furthermore, FIG. 2 shows the elastically resilient disk 10 fixed to the bottom of the pallet 2 and provided with a plurality of groove-like recesses, which correspond to the centering pins 9 of the chuck 1 as far as shape and position is concerned and which serve for determining the position of the pallet 2 with regard to the chuck 1 in X- and Y-directions. For positioning the pallet 2 in Z-direction, distance pins are provided (not shown in FIG. 2), preferably attached to the pallet 2. As is known in the art, the pallet 2 is clamped to the chuck 1 by means of clamping balls 23 engaging a shoulder of the clamping pin 19 of the pallet 2.

The damping element 20 located between the base plate 17 and the support plate 18 is attached by means of adhesive. To this end, the damping element 20 is glued both into the recess 21 of the base plate and into the recess 22 of the support plate. Also in this case, a small gap remains between the two plates 17, 18, but amounting only to a few tenths of a millimeter. Again, the gap is preferably filled with a pottant or at least sealed along its edge. This alternative possibility of fixing the damping plate 20 shows the advantage that no further connection exists between the two plates 17, 18 that could have an adverse impact on the damping properties. It is understood that the kind of fixing the damping element can be chosen to meet the different demands of a particular application.

Even if both the chuck 1 and the pallet 2 are provided with a damping element 7, 20 in the embodiment shown in the drawings and explained herein above, it may be sufficient, depending on the particular application, to provide only the chuck 1 with a damping element 20, or to provide only the pallet 2 with a damping element 7. Moreover, the damping characteristics of the damping elements 7, 20, consisting of a plurality of steel chips, compacted to a compressed composite of metal chips by high pressure, can be varied. As parameters influencing the damping characteristics of the damping elements 7, 20, the size and the thickness of the steel chips, the size and the thickness of the entire composite, the material of the chips, and the pressure applied to form the composite can be named.

What is claimed is:

1. A clamping apparatus comprising a chuck member and a pallet member adapted to be releasably fixed to said chuck member; said chuck member comprising clamping means for clamping said pallet member to said chuck member; said chuck member having first centering means and said pallet member having second centering means adapted to cooperate with said first centering means to define the relative position between said chuck member and said pallet member; and said chuck member and said pallet member both being provided with at least one damping element consisting at least partially of a compressed composite of metal chips.

2. A clamping apparatus according to claim 1 in which both said chuck member and said pallet member are provided with at least one recess adapted to receive said damping elements.

3. A clamping apparatus according to claim 2 in which said damping elements are glued into said recesses.

4. A clamping apparatus according to claim 1 in which both said chuck member and said pallet member are provided with a base plate and a support plate, whereby said damping element is inserted between said base plate and said support plate.

5. A clamping apparatus according to claim 4 in which said base plate and said support plate of said chuck member are connected to each other by means of connecting elements, whereby said connecting elements are attached to at least one of said base and support plates by means of elastic intermediate elements.

6. A clamping apparatus according to claim 1 in which said damping elements predominantly consist of stainless metal chips compacted to a compressed composite element.

7. A clamping apparatus according to claim 6 in which said metal chips are embedded in a pottant of plastic material.

8. A clamping apparatus according to claim 1 in which said damping element has a cylindrical or cubic shape.

9. A clamping apparatus comprising a chuck member and a pallet member adapted to be releasably fixed to said chuck member; said chuck member comprising clamping means for clamping said pallet member to said chuck member; said chuck member having first centering means and said pallet member having second centering means adapted to cooperate with said first centering means to define the relative position between said chuck member and said pallet member; and said chuck member being provided with at least one damping element consisting at least partially of a compressed composite of metal chips.

10. A clamping apparatus according to claim 9 in which said chuck member is provided with at least one recess adapted to receive said damping element.

11. A clamping apparatus according to claim 10 in which said damping element is glued into said recess.

12. A clamping apparatus according to claim 9 in which said chuck member is provided with a base plate and a support plate, whereby said damping element is inserted between said base plate and said support plate.

13. A clamping apparatus according to claim 9 in which said damping element predominantly consists of stainless metal chips compacted to a compressed composite element.

14. A clamping apparatus according to claim 13 in which said metal chips are embedded in a pottant of plastic material.

15. A clamping apparatus according to claim 9 in which said damping element has a cylindrical or cubic shape.

16. A clamping apparatus comprising a chuck member and a pallet member adapted to be releasably fixed to said chuck member; said chuck member comprising clamping means for clamping said pallet member to said chuck member; said chuck member having first centering means and said pallet member having second centering means adapted to cooperate with said first centering means to define the relative position between said chuck member and said pallet member; and said pallet member being provided with at least one damping element consisting at least partially of a compressed composite of metal chips.

17. A clamping apparatus according to claim 16 in which said pallet member is provided with at least one recess adapted to receive said damping element.

18. A clamping apparatus according to claim 17 in which said damping element is glued into said recesses.

19. A clamping apparatus according to claim 16 in which said pallet member is provided with a base plate and a support plate, whereby said damping element is inserted between said base plate and said support plate.

20. A clamping apparatus according to claim 16 in which said damping elements predominantly consists of stainless metal chips compacted to a compressed composite element.

21. A clamping apparatus according to claim 20 in which said metal chips are embedded in a pottant of plastic material.

22. A clamping apparatus according to claim 16 in which said damping element has a cylindrical or cubic shape.

* * * * *